(12) United States Patent
Kim

(10) Patent No.: US 6,304,976 B1
(45) Date of Patent: Oct. 16, 2001

(54) APPARATUS FOR SUPPLYING POWER IN COMPUTER SYSTEM

(75) Inventor: Sang-moo Kim, Anyang (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/220,597

(22) Filed: Dec. 28, 1998

(30) Foreign Application Priority Data

Dec. 26, 1997 (KR) .................................................. 97-74467

(51) Int. Cl.$^7$ ........................................................ G06F 1/26
(52) U.S. Cl. ............................................. 713/300; 713/310
(58) Field of Search .................................... 713/300, 310

(56) References Cited

U.S. PATENT DOCUMENTS

| | | | |
|---|---|---|---|
| 4,635,145 | * 1/1987 | Horie et al. | ............................. 360/78 |
| 5,193,176 | 3/1993 | Brandin . | |
| 5,339,446 | * 8/1994 | Yamasaki et al. | .................... 713/300 |
| 5,596,708 | 1/1997 | Weber . | |
| 5,596,762 | 1/1997 | Rudi . | |
| 5,598,567 | 1/1997 | Ninomiya . | |
| 5,625,819 | 4/1997 | Hoffer, Jr. . | |
| 5,781,784 | * 7/1998 | McKinley | ............................. 713/320 |
| 5,799,141 | 8/1998 | Galipeau et al. . | |
| 5,913,219 | * 6/1999 | Baek et al. | ........................... 707/202 |

FOREIGN PATENT DOCUMENTS

| | | | |
|---|---|---|---|
| 351124332A | * 10/1976 | (JP) | ................................ G06F/13/00 |
| 354125932A | * 9/1979 | (JP) | ................................... G06F/1/00 |
| 356040333A | * 4/1981 | (JP) | ................................... H04B/1/16 |
| 359108417A | * 6/1984 | (JP) | ..................................... H03J/5/00 |
| 40412721A | * 4/1992 | (JP) | ................................... G06F/1/26 |
| 06029902A | * 2/1994 | (JP) | ..................................... H04B/7/26 |
| 96-38568 | 11/1995 | (KR) . | |

* cited by examiner

Primary Examiner—Xuan M. Thai
(74) Attorney, Agent, or Firm—Robert E. Bushnell, Esq.

(57) ABSTRACT

A power supply apparatus and method in a computer system, which can protect an auxiliary memory device and data stored in the auxiliary memory device, are provided. The power supply apparatus in a computer system having an auxiliary memory device includes a power switch for switching on or off power supplied to the computer system, a power controller for generating a power off signal when it is detected that the power switch is turned off and drive active signals generated by the auxiliary memory device are deactivated, and generating a power on signal when it is detected that the power switch is turned on, and a switch mode power supply for converting alternating current power into direct current power and supplying the converted power to each apparatus included in the computer system, when the power on signal is received from the power controller, and cutting off the direct current power to the each apparatus, when the power off signal is received from the power controller. Therefore, the auxiliary memory device and data stored in the auxiliary memory device can be preemptively prevented from being damaged due to a user carelessly or inadvertently turning off the power supply during operation of the auxiliary memory device.

20 Claims, 2 Drawing Sheets

APPARATUS FOR SUPPLYING POWER IN COMPUTER SYSTEM

CLAIM OF PRIORITY

This application makes reference to, incorporates the same herein, and claims all benefits accruing under 35 U.S.C. §119 from an application entitled APPARATUS FOR SUPPLYING POWER IN COMPUTER SYSTEM earlier filed in the Korean Industrial Property Office on Dec. 26, 1997, and there duly assigned Ser. No. 97-74467, a copy of which is annexed hereto.

BACKGROUND OF THE INVENTION

1. Technical Field

The present invention relates to an apparatus for supplying power in a computer system, and more particularly to an apparatus which supplies power and which protects an auxiliary memory device and data stored in the auxiliary memory device, and a method therefor.

2. Related Art

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together. A computer system can be a desktop computer, a portable computer, or other type of computer.

The central processing unit is often described as a microprocessor. The microprocessor is an electronic component having internal logic circuitry handling most, if not all, the data processing in the computer system. The internal logic circuitry of microprocessors is typically divided into three functional parts known as the input/output (I/O) unit, the control unit, and the arithmetic-logic unit (ALU). These three functional parts interact together and determine the power and performance of the microprocessor. The combination of the control unit and the arithmetic-logic unit can be referred to as the central processing unit. Also, the combination of the input/output unit, the control unit, and the arithmetic-logic unit can be referred to as the central processing unit.

One example of non-volatile memory is read only memory. Information stored in non-volatile memory can remain unchanged even when there is a power failure. The information stored in non-volatile memory will stay there until it is changed. Read only memory is used to store important information such as instructions for the central processing unit. There are different types of read only memory including electrically-erasable-programmable-read-only-memory (EEPROM) chip and flash-read-only-memory (flash-ROM). The flash-ROM can also be referred to as flash memory.

Computer systems include a basic input output system (BIOS) which is an especially important program stored in read only memory. The basic input output system tests a computer every time the computer is powered on. The basic input output system can allocate a computer system's resources automatically, making adjustments needed to accommodate new hardware. Also, the basic input output system governs how system board components interact.

When the computer system is powered on, the basic input output system immediately takes control of the computer system and its components. The first duty of the basic input output system is to perform a series of diagnostic routines called the power on self test (POST) routine, which ensures that every part of the computer system's hardware is functioning properly.

I have found that an impediment frequently generated in the computer system is that data stored on the hard disk drive cannot be read due to damage to the hard disk drive. Such an impediment can be generated when power is cut off to the hard disk drive by a user turning off the power switch during operation of the hard disk drive. That is, since the head of the hard disk drive is close to the surface of a hard disk to access data stored on the hard disk, during operation of the hard disk drive, if power is cut off to the hard disk drive, the surface of the hard disk may become damaged. When damage occurs as described above, a damaged portion of the hard disk usually cannot be recovered, and information stored on the damaged portion is lost permanently. Such a problem is not limited to only the hard disk drive, and may also apply to an auxiliary memory device such as a floppy disk drive, a tape drive, and other connected components.

I have found that a hard disk drive can be damaged when power is cut off during operation of the hard disk drive. Efforts have been made to reduce this type of damage.

Exemplars of recent efforts in the art include U.S. Pat. No. 5,799,141 for REAL-TIME DATA PROTECTION SYSTEM AND METHOD issued to Galipeau, et al. U.S. Pat. No. 5,596,708 for METHOD AND APPARATUS FOR THE PROTECTION OF WRITE DATA IN A DISK ARRAY issued to Weber, U.S. Pat. No. 5,625,819 for METHOD AND APPARATUS FOR PERFORMING HEAP MANAGEMENT AND PROTECTING DATA STRUCTURE INTEGRITY IN NON-VOLATILE MEMORY issued to Hoffer, Jr., U.S. Pat. No. 5,598,567 for APPARATUS FOR CONTROLLING POWER SUPPLY IN A COMPUTER SYSTEM BY INTRODUCING DELAYS BEFORE ACTIVATION AND DEACTIVATION OF POWER issued to Ninomiya, U.S. Pat. No. 5,596,762 for SMALL-SIZE COMPUTER HAVING PLUGGABLE MEMORY UNIT FOR DATA PROTECTION issued to Rudi, and U.S. Pat. No. 5,193,176 for COMPUTER WORK SAVING DURING POWER INTERRUPTION issued to Brandin.

While these recent efforts provide advantages, I note that they fail to adequately provide a method for efficiently and conveniently avoiding damage to a hard disk drive when power is cut off during operation of the hard disk drive.

SUMMARY OF THE INVENTION

To solve the above problems, it is an objective of the present invention to provide an apparatus for supplying power in a computer system, which can stably preserve an auxiliary memory device and data stored in the auxiliary memory device even when a user of the computer system turns power off during operation of an auxiliary memory device provided in the computer system. It is also an objective of the present invention to provide a method therefor.

Accordingly, to achieve the above objectives and others, there is provided a power supply apparatus in a computer system having an auxiliary memory device, which receives alternating current power from an external source, comprising: a power switch for switching on or off power supplied to the computer system; a power controller for generating a power off signal when it is detected that the power switch is turned off and drive active signals generated by the auxiliary memory device are deactivated, and generating a power on signal when it is detected that the power switch is turned on; and a switch mode power supply for converting alternating current power into direct current power and supplying the converted power to each apparatus included in the computer system, when the power on signal is received from the power controller, and cutting off the direct current power to the each apparatus, when the power off signal is received from the power controller.

To achieve the above objectives and others, there is also provided a power supply method in a computer system having an auxiliary memory device, which receives external alternating current power, wherein when power is switched on, an alternating current power is converted into a direct current power and the converted power is supplied to each apparatus provided in the computer system, and when power is switched off, direct current power is not cut off to each apparatus provided in the computer system until the operation of the auxiliary memory device is completed.

To achieve these and other objects in accordance with the principles of the present invention, as embodied and broadly described, the present invention provides an apparatus, comprising: at least one access unit accessing data and receiving power, said at least one access unit generating a first signal when said at least one access unit accesses the data; a switch switching on to supply power to said at least one access unit, and said switch switching off to cut off power supplied to said at least one access unit; a control unit generating a power off signal when said at least one access unit does not generate said first signal and said switch switches off, said control unit generating a power on signal when said switch switches on, said control unit being electrically coupled to said at least one access unit and said switch; and a power supply supplying power to said at least one access unit when said power on signal is received from said control unit, said power supply cutting off power supplied to said at least one access unit when said power off signal is received from said control unit, said power supply being electrically coupled to said at least one access unit and said control unit.

To achieve these and other objects in accordance with the principles of the present invention, as embodied and broadly described, the present invention provides a method, comprising: switching a switch on to supply power to a memory unit of a computer system; generating a power-on control signal when said switch switches on, wherein a control unit generates said power-on control signal;

supplying power to said memory unit when said power-on control signal is received, said supplying of power being performed by a power supply unit; switching said switch off to cut off power supplied to said memory unit; generating a power-off control signal when said switch switches off and said memory unit is not accessing data; and cutting off power supplied to said memory unit when said power-off control signal is received.

To achieve these and other objects in accordance with the principles of the present invention as embodied and broadly described, the present invention provides a method, comprising: receiving power to a computer system having an auxiliary memory device; when a power switch is switched on, supplying power to said auxiliary memory device; and when said power switch is switched off, cutting off the supply of power to said auxiliary memory device when operation of said auxiliary memory device is completed.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to exemplify the principles of this invention.

DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
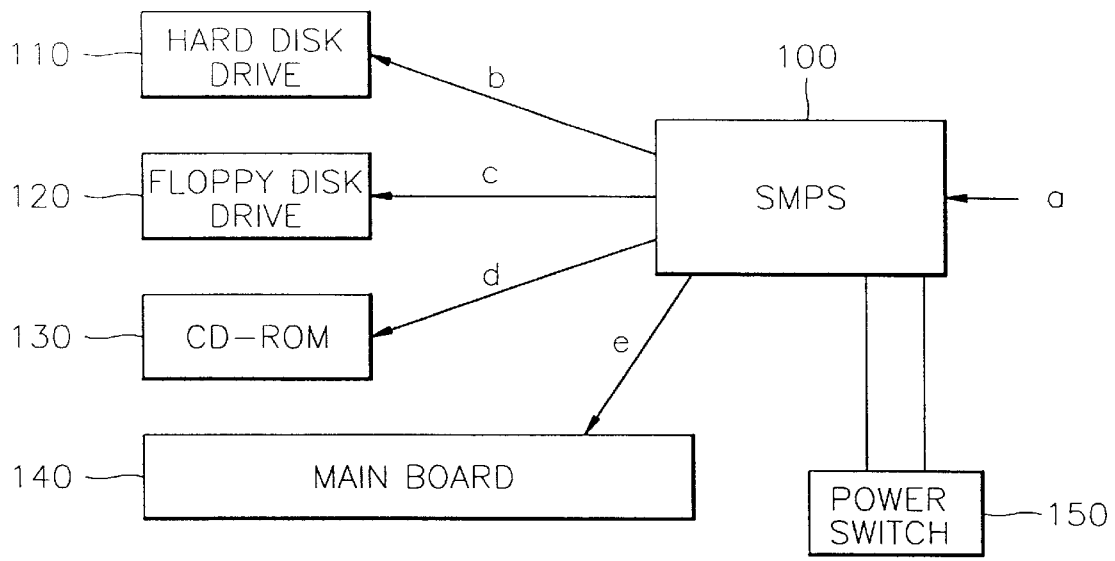
FIG. 1 is a block diagram illustrating the operational relationship between a power supply apparatus and other apparatuses in a computer system.

FIG. 1 is a block diagram illustrating the operational relationship between a power supply apparatus for a computer system and another apparatus. A process for supplying power to various apparatuses installed in a computer system will now be described referring to FIG. 1.

A switching mode power supply (SMPS) 100 receives alternating current (AC) power a from an external power source. Then the switching mode power supply 100 converts the received alternating current power a into various direct current (DC) power levels b, c, d, and e. Then the switching mode power supply 100 supplies the direct current power b to a hard disk drive (HDD) 110 and supplies the direct current power c to a floppy disk drive (FDD) 120. The switching mode power supply 100 also supplies the direct current power d to a compact disc-read only memory (CD-ROM) drive 130 and supplies the direct current power e to a main board 140. The aforementioned various direct current power levels b, c, d, and e can correspond to 5 volts, 12 volts, 3.3 volts, −5 volts, −12 volts, or other levels, for example.

Supply of power to various devices provided in such a computer system is determined by a user's manipulation of a power switch 150. That is, when the power switch 150 is turned on, the direct current power levels b, c, d, and e. which have been appropriately converted by the switching mode power supply 100, are supplied to various devices. Otherwise, the direct current power levels b, c, d, and e are not supplied.

I have found that an impediment frequently generated in the computer system is that data stored on the hard disk drive cannot be read due to damage to the hard disk drive. Such an impediment can be generated when power is cut off to the hard disk drive by a user turning off the power switch during operation of the hard disk drive. That is, since the head of the hard disk drive is close to the surface of a hard disk to access data stored on the hard disk, during operation of the hard disk drive, if power is cut off to the hard disk drive, the surface of the hard disk may become damaged. When damage occurs as described above, a damaged portion of the hard disk usually cannot be recovered, and information stored on the damaged portion is lost permanently. Such a problem is not limited to only the hard disk drive, and may also apply to an auxiliary memory device such as a floppy disk drive, a tape drive, and other components.

Figure 2:
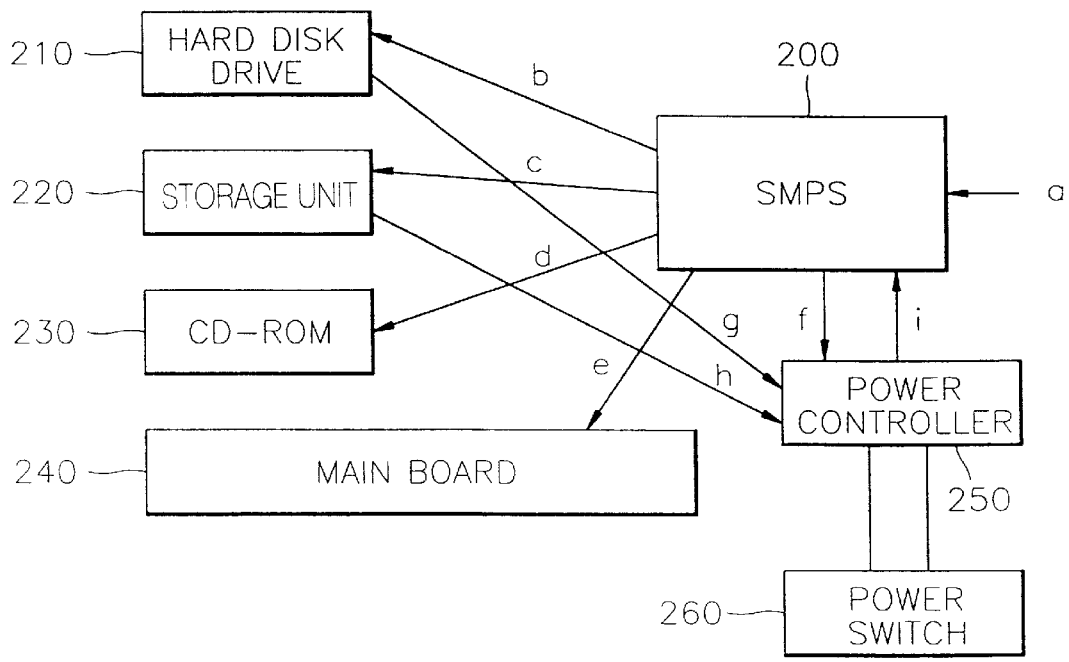
FIG. 2 is a block diagram illustrating the operational relationship between a power supply apparatus and other apparatuses in a computer system, in accordance with the principles of the present invention.

Referring to FIG. 2, a power supply apparatus in a computer system according to the present invention is comprised of a power switch 260, a power controller 250, and a switching mode power supply (SMPS) 200. The power switch 260 is operated by a user, and power supplied to the computer system can be turned on or off. FIG. 2 depicts a hard disk drive 210, a storage unit 220, a compact disc-read only memory (CD-ROM) drive 230, and a main board 240. The main board 240 corresponds to a main computer board. The storage unit 220 can be a floppy disk drive, a second hard disk drive, a digital versatile disk (DVD), a compact disk-recordable (CD-R), a compact disk-erasable (CD-E), a phase change disk (PCD), a phase disk (PD), a tape drive, a removable disk hard drive, or any other type of storage device.

When the power controller 250 detects that the power switch 260 is turned off, the power controller 250 generates a power off signal i to prevent power from being supplied to various components provided in the computer system. The power off signal i is transmitted from the power controller 250 to the switching mode power supply 200 when drive active (DA) signals g and h are deactivated. Here, if the drive active (DA) signals g and h are activated, the power controller 250 waits until the drive active (DA) signals are deactivated.

The drive active (DA) signals are generated in an auxiliary memory device such as a hard disk drive (HDD), a floppy disk drive (FDD), or a tape drive. The drive active (DA) signals are activated when a corresponding auxiliary memory device is being operated. The drive active (DA) signals are deactivated when a corresponding auxiliary memory device is not being operated.

On the other hand, when the power controller 250 detects that the power switch 260 is turned on, the power controller 250 generates a power on signal i for immediately supplying power to various components provided in the computer system, and transmits the power on signal i to the switching mode power supply 200.

A computer system having a hard disk drive which uses an integrated drive electronics (IDE) interface uses as the drive active (DA) signal a control signal for controlling a light emitting diode (LED) included in the hard disk drive. A control signal similar to the above control signal is provided even in a hard disk drive using other interfaces. This control signal is activated when "reading" or "writing" is conducted. That is, this control signal is activated when a drive is accessed.

The light emitting diode turns on to emit light when the hard disk drive is reading data and when the hard disk drive is writing data. Thus, the light emitting diode turns on to emit light when the hard disk drive is accessing data.

This control signal is activated after the auxiliary memory device such as the hard disk drive, the floppy disk drive, the tape drive, or other device, receives a "read" or "write" command from a central processing unit in the computer system. Thus, use of this control signal indicates whether reading or writing is being currently performed in an auxiliary memory device.

The power controller 250 can be realized by using a microcomputer. In this case, the power controller 250 always receives power f from the switching mode power supply 200, if a power cord is connected to the switching mode power supply 200 and the switching mode power supply 200 is supplied with alternating current (AC) power a even though the power switch 260 is turned off.

Thus, the power supply apparatus in the computer system according to the present invention is more suitable to a soft switching method than to a mechanical switching method.

The switching mode power supply 200 converts the alternating current power a supplied from the outside of the computer system into direct current (DC) power levels b, c, d, and e and supplies the converted power to each component, when it receives the power on signal i from the power controller 250.

When the switching mode power supply 200 receives the power off signal i from the power controller 250, the switching mode power supply 200 prevents the direct current power levels b, c, d, and e from being supplied to the respective components. Here, the cut-off power does not include power that the switching mode power supply 200 supplies to the power controller 250.

Figure 3:
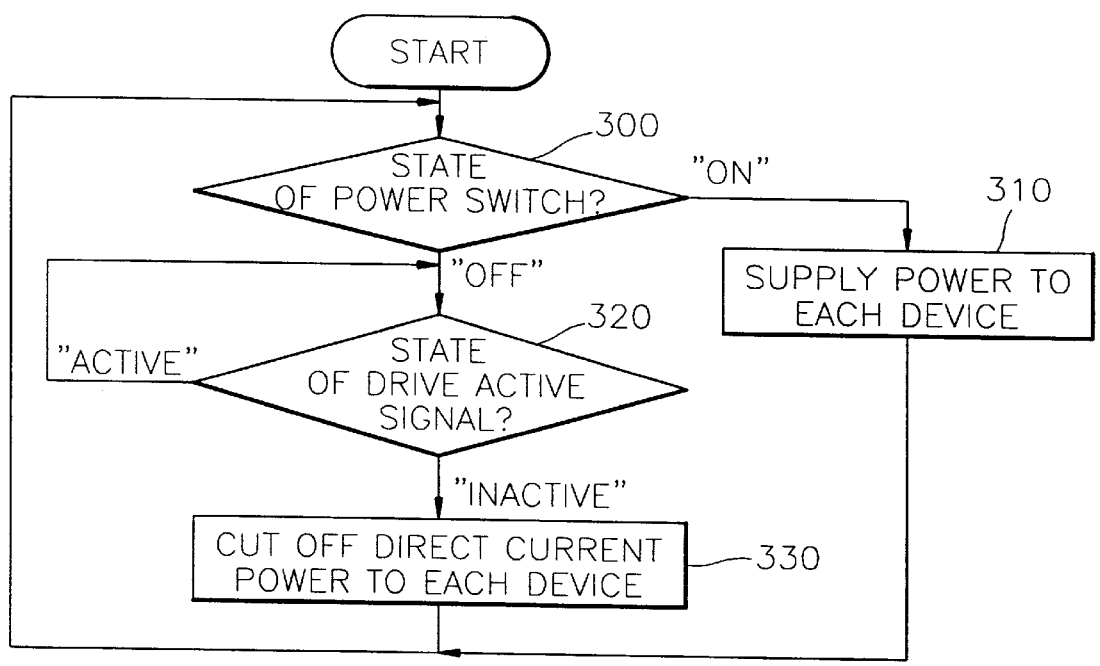
FIG. 3 is a flowchart illustrating a process for supplying power in a computer system, in accordance with the principles of the present invention.

Referring to FIG. 3, a power suppling process in a computer system having an auxiliary memory device, according to the present invention, is controlled by the power controller 250 of FIG. 2.

In FIG. 3, at step 300, the power controller 250 repeatedly checks the state of the power switch 260, when a power cord is connected to the computer system and the switching mode power supply 200 is supplied with alternating current power. At step 310, when a user switches on the computer system, the power controller 250 sends a control signal to control the switching mode power supply 200 to supply direct current power to each component included in the computer system.

In FIG. 3, at step 320, when the user switches off the computer system, the power controller 250 first checks the drive active (DA) signals before sending a control signal to control the switching mode power supply 200 to cut off the direct current power to each component included in the computer system.

At step 330, when all drive active (DA) signals are inactive, the control signal is sent to allow the switching mode power supply 200 to cut off the direct current power. However, when any drive active (DA) signal is active, the power controller 250 waits until the operation of the auxiliary memory device is completed, and then, after completion of the operation thereof, the power controller 250 sends a control signal to the switching mode power supply 200 to prevent the direct current power from being supplied to each component included in the computer system.

In other words, when any drive active (DA) signal is active, the power controller 250 waits until the all drive active (DA) signals become inactive, and then the power controller 250 sends a control signal to the switching mode power supply 200 to prevent the direct current power from being supplied to each component included in the computer system.

As stated above, the storage unit 220 of FIG. 2 can be a floppy disk drive, a second hard disk drive, a digital versatile disk (DVD), a compact disk-recordable (CD-R), a compact disk-erasable (CD-E), a phase change disk (PCD), a phase disk (PD), a tape drive, a removable disk hard drive, or any other type of storage device. Each one of the aforementioned devices can include a respective light emitting diode which will turn on to emit light when the respective device is accessing data.

The switching mode power supply 200 of FIG. 2 can be replaced with a different type of power supply. In other words, the present invention does not require a switching mode power supply.

According to the present invention, an auxiliary memory device and data stored in the auxiliary memory device can be preemptively prevented from being damaged due to a user carelessly or inadvertently turning off power during operation of the auxiliary memory device.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   at least one memory unit storing data, said at least one memory unit generating a first signal when said at least one memory unit performs at least one selected from among a reading of data from said at least one memory unit and a writing of data to said at least one memory unit;
   a switch switching on to supply power to said at least one memory unit, and said switch switching off to cut off power supplied to said at least one memory unit;
   a control unit generating a power off signal when said at least one memory unit does not generate said first signal and said switch switches off, said control unit generating a power on signal when said switch switches on, said control unit preventing damage to said at least one memory unit by not generating said power off signal when said at least one memory unit generates said first signal; and
   a power supply supplying power to said at least one memory unit when said power on signal is received from said control unit, said power supply cutting off power supplied to said at least one memory unit when said power off signal is received from said control unit.

2. The apparatus of claim 1, wherein said power supply comprises a switching mode power supply.

3. The apparatus of claim 1, wherein said power supply receives alternating current power from a power source and outputs direct current power to said at least one memory unit.

4. The apparatus of claim 2, wherein said at least one memory unit comprises a hard disk drive storage unit.

5. The apparatus of claim 4, wherein said hard disk drive storage unit, said switch, said power supply, and said control unit further comprise a computer system.

6. The apparatus of claim 1, wherein said at least one memory unit, said switch, said power supply, and said control unit further comprise a computer system.

7. The apparatus of claim 1, wherein said at least one memory unit is a unit selected from among a floppy disk drive storage unit, a compact disk-recordable unit, a compact disk-erasable unit, a tape drive, and a removable disk hard drive.

8. The apparatus of claim 1, wherein said at least one memory unit is a unit selected from among a floppy disk drive storage unit, a digital versatile disk unit, a phase change disk unit, and a phase disk unit.

9. The apparatus of claim 2, wherein said at least one memory unit is a unit selected from among a floppy disk drive storage unit, a compact disk-recordable unit, a compact disk-erasable unit, a tape drive, and a removable disk hard drive.

10. The apparatus of claim 1, wherein said at least one memory unit further comprises a light emitting diode turning on to emit light when said first signal is generated by said at least one access unit.

11. The apparatus of claim 10, wherein said first signal generated by said at least one memory unit comprises a control signal controlling said light emitting diode provided in said at least one access unit.

12. A method, comprising:
    switching a switch on to supply power to a memory unit of a computer system;
    generating a power-on control signal when said switch switches on, wherein a control unit generates said power-on control signal;
    supplying power to said memory unit when said power-on control signal is received, said supplying of power being performed by a power supply unit;
    switching said switch off to cut off power supplied to said memory unit;
    generating a power-off control signal when said switch switches off and said memory unit is not performing at least one function selected from among a reading of data from said memory unit and a writing of data to said memory unit, preventing damage to said memory unit by not generating said power-off control signal when said memory unit is performing said at least one function; and
    cutting off power supplied to said memory unit when said power-off control signal is received.

13. The method of claim 12, wherein said power-on control signal and said power-off control signal are generated by said control unit, said control unit being coupled to said switch and said memory unit.

14. The method of claim 12, wherein said power supply unit receives alternating current power from an external power source, converts the alternating current power into direct current power, and then supplies the direct current power to said memory unit.

15. The method of claim 12, wherein said memory unit is a unit selected from among a hard disk drive storage unit, a floppy disk drive storage unit, a compact disk-recordable storage unit, a compact disk-erasable storage unit, a tape drive, and a removable disk hard drive.

16. The method of claim 12, wherein said memory unit is a unit selected from among a digital versatile disk unit, a phase change disk unit, and a phase disk unit.

17. A method, comprising:
    receiving power to a computer system having an auxiliary memory device;
    when a power switch is switched on, supplying power to said auxiliary memory device; and
    when said power switch is switched off, cutting off the supply of power to said auxiliary memory device only when operation of said auxiliary memory device is completed to prevent damage to said auxiliary memory device;

said operation of said auxiliary memory device comprising one selected from among a reading of data from said auxiliary memory device and a writing of data to said auxiliary memory device.

18. The method of claim 17, further comprising converting alternating current power received by said computer system to direct current power and then supplying direct current power to said auxiliary memory device when said power switch is switched on.

19. The method of claim 17, wherein alternating current power is received by said computer system and direct current power is supplied to said auxiliary memory device.

20. The method of claim 19, wherein power is supplied to said auxiliary memory device by a switching mode power supply.

* * * * *